United States Patent
Walsh et al.

(10) Patent No.: US 6,202,121 B1
(45) Date of Patent: Mar. 13, 2001

(54) SYSTEM AND METHOD FOR IMPROVED PROGRAM LAUNCH TIME

(75) Inventors: James Edward Walsh, Kirkland; Benjamin Aaron Rudiak-Gould, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/060,702

(22) Filed: Apr. 15, 1998

(51) Int. Cl.⁷ .................................................. G06F 12/00
(52) U.S. Cl. ........................... 711/100; 713/1; 713/2; 717/11
(58) Field of Search ................... 711/111; 713/1, 713/2, 500; 395/712; 717/11

(56) References Cited

U.S. PATENT DOCUMENTS

| | | | |
|---|---|---|---|
| 5,325,532 | * 6/1994 | Crosswy et al. | 713/2 |
| 5,432,937 | * 7/1995 | Tevanian et al. | 717/11 |
| 5,560,001 | * 9/1996 | Kardach et al. | 713/500 |
| 5,574,907 | 11/1996 | Jernigan, IV et al. | 707/1 |
| 5,696,975 | * 12/1997 | Moore et al. | 395/712 |
| 5,857,101 | * 1/1999 | Ballard et al. | 713/1 |
| 5,933,630 | * 8/1999 | Ballard et al. | 713/1 |

FOREIGN PATENT DOCUMENTS

0690369 A2  1/1996 (EP).
WO 97/37313  10/1997 (WO).

OTHER PUBLICATIONS

"Microsoft and Intel Work Together to Significantly Decrease Application Start–Up Time for Customers of Windows 98", *PR Newswire*, Sep. 30, 1997.

"Profiled Guided File System Restructing", *IBM Technical Disclosure Bulletin*, Serial No. TDB0196.0112, Jan. 1996.

* cited by examiner

*Primary Examiner*—Do Hyun Yoo
*Assistant Examiner*—Nasser Moazzami
(74) *Attorney, Agent, or Firm*—Kilpatrick Stockton LLP (57) ABSTRACT

Installing files on a hard disk drive in a manner that improves program launch time. After a build of a program is completed, the program is launched and the disk activity associated with disk-intensive operations is monitored to determine the order in which file portions are read from a disk during program or command launch. This data is used to create a load sequence list, which indicates the order in which various portions of the files are read during launch. The installation disks include the files and the load sequence list. During the installation process, the installation program reads the data from the load sequence list and writes the file portions so they are stored in the order prescribed by the load sequence list in contiguous clusters on the hard disk drive. The computer can then read launch-related data from the disk in the proper order from contiguous disk clusters, which minimizes or eliminates wasted time that would result from disk accesses if the disk heads had to move between non-contiguous clusters in order to read the launch-related data.

19 Claims, 5 Drawing Sheets

Load Sequence List

| File ID | Offset | Length |
|---------|--------|--------|
| c14d8220 | 80 | 1c0 |
| 023c0000 | a00 | e0 |
| ... | ... | ... |

Fig. 4

|  | Launch-related portions | Non-Launch-related portions |
|---|---|---|
| File A portions: | A1 A2 A3 A4 | A5 A6 A7 A8 |
| File B portions: | B1 B2 B3 | B4 B5 B6 |
| File C portions: | C1 C2 C3 | C4 C5 |
| File D portions: |  | D1 D2 D3 D4 D5 |
| Launch sequence: | A1 B3 A3 B2 B1 C2 C1 A2 C3 A4 |  |

Fig. 5

Clusters

| | 0 | 1 | 2 | 3 | 4 | 5 | 6 | 7 | 8 | 9 | 10 | 11 |
|---|---|---|---|---|---|---|---|---|---|---|---|---|
| Before install | [-------------------------------- Free --------------------------------] | | | | | | | | | | | |
| Pass 1 | A1 | [t1] | [t2] | [t3] | B1 | [t4] | C1 | A2 | [t5] | [t6] | [--- t7 ---] | |
| Pass 2 | A1 | [t1] | A3 | B2 | B1 | C2 | C1 | A2 | C3 | A4 | [--- t7 ---] | |
| Pass 3 | A1 | B3 | A3 | B2 | B1 | C2 | C1 | A2 | C3 | A4 | [- Free -] | |

Fig. 6

Clusters

| | 0 | 1 | 2 | 3 | 4 | 5 | 6 | 7 | 8 | 9 | 10 | 11 |
|---|---|---|---|---|---|---|---|---|---|---|---|---|
| Before install | [-------------------------------- Free --------------------------------] | | | | | | | | | | | |
| Pass 1 | [t1] | [t2] | [t3] | [t4] | [t5] | [t6] | [t7] | [t8] | [t9] | [t10] | [-- t11 --] | |
| Pass 2 | A1 | [t2] | [t3] | [t4] | B1 | [t6] | C1 | A2 | [t9] | [t10] | [-- t11 --] | |
| Pass 3 | A1 | [t2] | A3 | B2 | B1 | C2 | C1 | A2 | C3 | A4 | [-- t11 --] | |
| Pass 4 | A1 | B3 | A3 | B2 | B1 | C2 | C1 | A2 | C3 | A4 | [- Free -] | |

SYSTEM AND METHOD FOR IMPROVED PROGRAM LAUNCH TIME

TECHNICAL FIELD

The present invention relates to storing data on a hard disk drive, and more particularly relates to storing data in a way that reduces the time required to read the data from a disk during program startup and other disk-intensive operations.

BACKGROUND OF THE INVENTION

In the context of magnetic disk drives used for storing computer data, the term fragmentation is used to refer to the non-contiguous arrangement of files on a disk partition or logical disk. Fragmented files can refer to parts of the same disk file scattered over different areas of the logical disk or to the scattering of whole files so that there is unused space between files. Fragmentation often occurs as old files are deleted from the logical disk and new files are added. As files are deleted and the previously used space becomes available, the computer's operating system writes new files into the vacant areas of the logical disk. However, if a new file is too large to fit in a vacant area, the operating system may fragment the file by storing portions of the file in several vacant areas, which may be scattered throughout the logical disk. Likewise, an existing file may become fragmented if its size increases beyond the size of the contiguous free space adjacent the space in which the file is stored. The operating system maintains a record of where each part of a file is stored so the file can be retrieved in the proper order when the file is read from the logical disk.

In situations where a file is read "linearly" from beginning to end, fragmentation slows disk access and degrades the overall performance of disk operations. Utility programs are available to defragment the files on fragmented disks. In addition to rearranging the files so that each file is stored in contiguous portions of the disk, these programs usually arrange the files so that they are all stored at the beginning of the logical disk. This consolidates vacant space at the end of the disk and is considered beneficial because the operating system need not search as long in order to locate sufficient available space in which to store new files, and the new files are more likely to be stored in contiguous clusters (i.e., unfragmented), rather than in numerous smaller groups of clusters scattered throughout the disk.

Defragmentation is advantageous and improves performance when the unfragmented files are read linearly from beginning to end. However, when some operations are performed, the computer retrieves blocks of data from several different files in some predictable sequence, while often reading only a few blocks from each file. For example, launching a word processing program may result in loading a first part of the main executable, a portion of a dynamic linked library, a second portion of the main executable, a preferences file, etc. Similar disk activity occurs when some program commands (e.g., "File Open") are selected. These types of disk-intensive operations can result in a lot of disk head movement from one physical cluster to another. Because modern microprocessors are so fast in comparison to a disk drive's average seek time and many different files must be read from the disk in order to launch a typical program, a large portion of the time required to launch a program is spent with the microprocessor sitting idle waiting for the disk heads to move from one cluster to another.

Based on these observations, it is advantageous, when performing a disk-intensive operation (e.g., launching a program or launching code associated with some commands) to arrange the data blocks used during the disk-intensive operation on the logical disk partition (and thus on the physical disk) in the order they are accessed during that operation. This would result in the program files being "fragmented" by design and would improve performance by reducing the number of non-sequential disk accesses needed to load the required data from the logical disk.

The prior art describes this type of restructuring or fragmenting of application files in order to optimize the application launch process. For example, IBM Technical Disclosure Bulletin Serial No. TDB0196.0112 describes what it calls profile guided file system restructuring. Instead of arranging files based on static assumptions about file reference patterns, the system dynamically determines file access patterns as programs are run and allocates disk space to maximize file system performance for each hardware/software configuration the program is run on. To accomplish this, file system activity is monitored while the program starts up and the accessed disk sectors are logged to a file that contains profile data. At predetermined intervals, the profile data is analyzed to determine if a more optimal file allocation structure is possible. If so, the operator can run a restructuring program that allocates disk space to files based upon the disk access patterns indicated in the profile data. The program would map the disk block access addresses from the profile data to their associated files and place the frequently accessed blocks physically close together on the disk. The resulting disk block allocation structure would be optimized for the common access patterns for that specific computer configuration.

Microsoft Corporation has also announced that its "WINDOWS 98" operating system will include features that allow it to monitor disk activity during application program launch and rearrange the stored files so that data blocks used during startup are arranged in sequential fashion.

Although the prior art describes a process for optimizing files for program startup, these techniques are performed after programs are installed on a computer and subsequently launched by a user. This approach includes several drawbacks. For example, optimization cannot take place until a program has been installed and launched and the startup process has been monitored. The process of monitoring disk accesses during program startup can slow the startup process significantly. After the startup process is monitored, the computer must run a time-consuming optimization routine, which will prevent the user from using the computer during the optimization process or require the user to leave the computer on so the routine can be run after hours. Finally, this approach is suited only for monitoring and optimizing the startup process, but not for other disk-intensive operations, such as loading the code associated with some commands (e.g., "File Open").

Where the optimization features are implemented in operating system software, a user would have to obtain and install a copy of the appropriate version of the operating system in order to avail himself of these optimization features. In many cases, users are reluctant to spend the money or time required to upgrade their operating system software in order to take advantage of new features, or may be in a corporation where they do not make this decision on their own. This results in a large number of users who use older versions of an operating system and are unable to experience improved performance at application startup.

Therefore, there is a need in the art for an improved system and method for storing data on a logical disk in the order in which it will be accessed when applications or commands are launched. Such a method should avoid the need to monitor application program files after they are installed on a logical disk and should not require users to acquire and install a new version of their operating system software.

SUMMARY OF THE INVENTION

The present invention satisfies the above-described need by installing, or later rearranging, a program so the launch-related portions, which are read when the program is launched or a command is executed, are stored in an order as close as possible to that in which they are read during a typical launch. The software that is used during or after installation includes the necessary program files and a load sequence list, which identifies the order in which launch-related portions of the files are read. During installation or later reordering, the launch-related portions of the files are arranged in the order indicated in the load sequence list, with the launch-related portions preferably being stored in contiguous clusters on the logical disk. The remainder of the files are installed in other free space on the disk. When a user runs the program, startup time will be reduced because the computer will be able to read the startup files in the proper order from contiguous clusters on the logical disk, thereby reducing delays associated with reading data from non-contiguous clusters.

Generally described, the present invention provides a computer-readable installation medium and allows programs to be installed or later rearranged in a manner that accelerates the process of starting up, or launching, a program or other disk-intensive operations. The installation medium includes a plurality of files, which include launch-related portions, and a load sequence list. The load sequence list indicates the order in which the launch-related portions of the files are to be arranged on a logical disk. The installation medium also includes computer-executable instructions for performing installation or reordering steps. Installation or reordering includes identifying at least one group of contiguous free clusters on the logical disk. The launch-related portions of the plurality of files are installed in a group of contiguous free clusters, with the launch-related portions being stored on the hard disk drive in the order indicated in the load sequence list.

In another aspect, the present invention provides a method for installing program code from an installation disk to a hard disk drive. The method includes the step of reading entries from a load sequence list stored on the installation disk. Each of the entries identifies a file portion associated with the program code. For each entry read from the load sequence list, the file portion identified by the entry is read from the installation disk and written to a group of contiguous free clusters on the hard disk drive. The file portion are stored on the hard disk drive in an order corresponding to the entries in the load sequence list.

In yet another aspect, the present invention provides a method for creating program code and installing it from an installation disk to a logical disk. The method includes creating files that include launch-related portions and determining the order in which the launch-related portions are read during program launch or other disk-intensive operations. A load sequence list is created to reflect the order in which the launch-related portions are read during program launch. The files, the load sequence list, and an installation program are stored on an installation disk. The installation program includes computer-executable instructions for identifying at least one group of contiguous free clusters on a logical disk and installing the launch-related portions of the plurality of files in one or more groups of contiguous free clusters. The launch-related portions are stored on the logical disk in the order indicated in the load sequence list.

In still another aspect, the present invention provides a method for installing and optimizing program code on a logical disk. The method includes the steps of creating a plurality of files that include portions associated with disk-intensive operations and determining the order in which the disk intensive portions are read during the disk-intensive operations. A load sequence list is created to indicate the order in which the disk-intensive portions are read during the disk intensive operations. The plurality of files and the load sequence list are installed on a logical disk. After installation, the disk-intensive portions are optimized by identifying at least one group of contiguous free clusters on the logical disk and rearranging the disk-intensive portions in the free clusters. The disk-intensive portions are stored on the logical disk in the order indicated in the load sequence list.

The various aspects of the present invention may be more clearly understood and appreciated from a review of the following detailed description of the disclosed embodiments and by reference to the appended drawings and claims.

DETAILED DESCRIPTION

The present invention is directed to an improved system and method for installing a program on a hard disk drive. In an exemplary embodiment, the application-related files are installed on a logical disk partition (i.e., on a logical subset of a physical disk drive) so that the launch-related portions, which are read when the program is launched or a command is selected, are stored in the order in which they are read during launch. The installation software includes the necessary files and a load sequence list, which identifies the order in which launch-related portions of the files are loaded during launch. During installation, the portions of the files that are used during launch are installed in the order indicated in the load sequence list, with the launch-related portions preferably being stored in contiguous clusters on the logical disk. The remainder of the files are installed in other free space on the logical disk. Alternatively, the program files may be installed in a conventional manner and the launch-related portions subsequently rearranged in the order indicated in a load sequence list. When a user launches the program or selects a command, launch time will be reduced because the computer will be able to read the launch-related portions files in the proper order from contiguous clusters on the disk, thereby reducing delays associated with reading data from non-contiguous clusters.

Referring now to the drawings, in which like numerals represent like elements throughout the several figures, aspects of the present invention and an exemplary operating environment will be described.

EXEMPLARY OPERATING ENVIRONMENT

Figure 1:
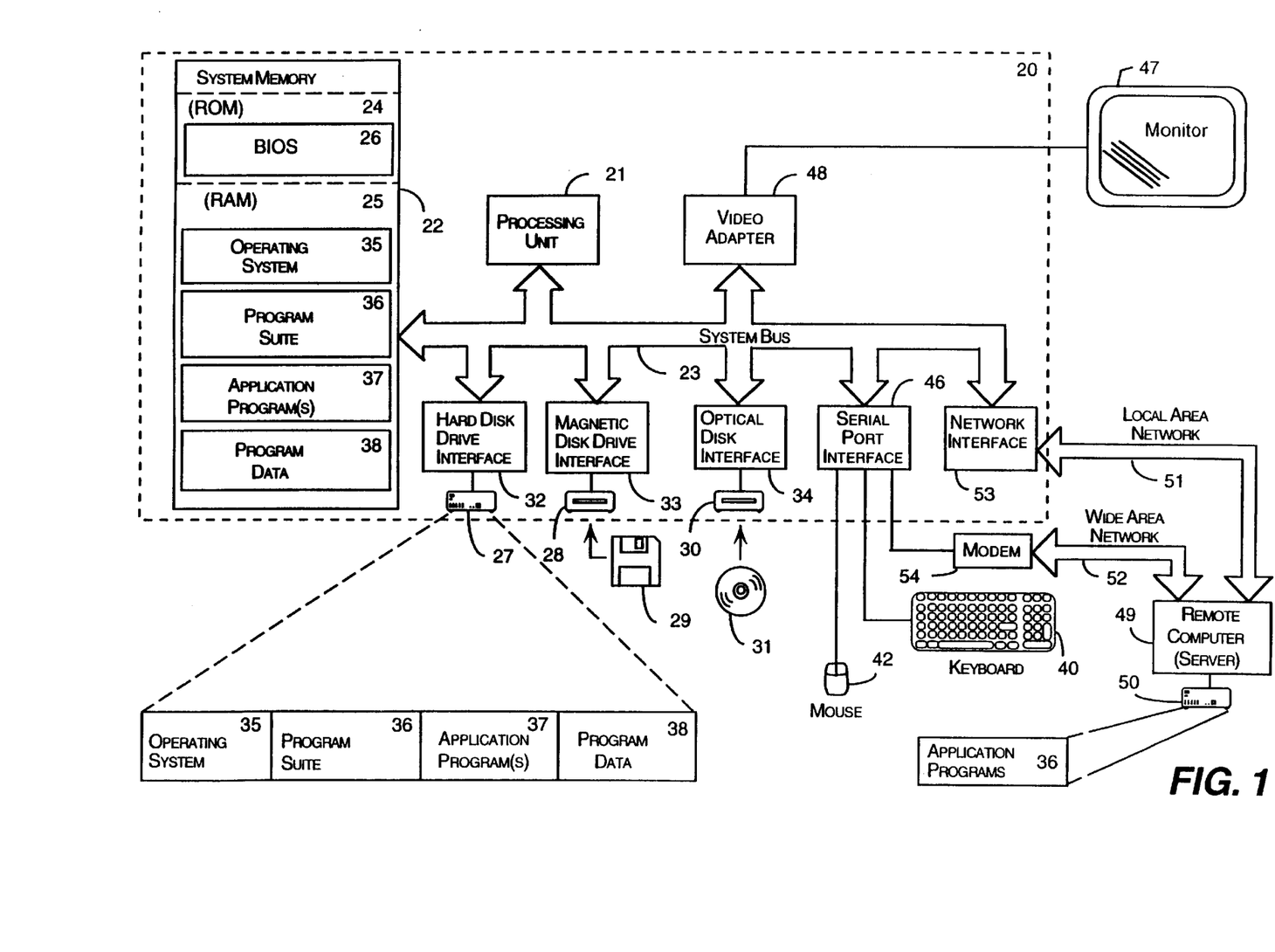
FIG. 1 is a block diagram of a personal computer that provides the operating environment for an embodiment of the present invention.

FIG. 1 and the following discussion are intended to provide a brief, general description of a suitable computing environment in which the present invention may be implemented. While the invention will be described in the general context of a setup program that is used to install an application program on a hard disk drive associated with a personal computer, those skilled in the art will recognize that the invention also may be implemented in combination with a variety of program modules, including application program modules, operating system program modules, utility program modules, and the like. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a removable magnetic disk drive 28, e.g., to read from or write to a removable disk 29, and an optical disk drive 30, e.g., for reading a CD-ROM disk 31 or to read from or write to other optical media. The hard disk drive 27, removable magnetic disk drive 28, and optical disk drive 30 are connected to the system bus 23 by a hard disk drive interface 32, a magnetic disk drive interface 33, and an optical disk interface 34, respectively. The drives and their associated computer-readable media provide nonvolatile storage for the personal computer 20. Those skilled in the art will appreciate that a single hard disk drive 27 includes one or more "partitions" or "logical disks," which are logical subsets of a physical drive device. Although the description of computer-readable media above refers to a hard disk drive, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored on the drives and in RAM 25, including an operating system 35 (e.g., Microsoft Corporation's "WINDOWS 95" operating system), a suite of application programs 36 (e.g., the "MICROSOFT OFFICE" program suite), one or more other application programs 37, and data 38. Operating system software and application programs are typically installed on the hard disk drive 27 from a CD-ROM 31 or floppy disks 29. In most cases, the installation process is controlled by a setup program or installation program that is stored on the CD-ROM or floppy disks along with the operating system or application-related files.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a mail server (which includes one or more message stores), a file server (which includes one or more file stores), a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

CONVENTIONAL DISK DRIVE FORMATTING

Before describing the features of the present invention, it is helpful to describe the manner in which data is stored on conventional hard disk drives.

Hard disk drives allow computers to alter the data that is stored thereon, so data can be both read from and written to the magnetic disk. A physical disk drive includes one or more partitions or logical disks, which are logical subsets of the physical drive. The data is usually stored on a logical disk as separate files, with each file being independently accessible. The location on the disk where each file is stored is identified and stored in a data structure that allows the computer to quickly access any of the files on the logical disk.

When a hard disk drive is formatted for use, the storage area on the disk is divided into concentric circles called tracks. The number of tracks on a disk depends on the size of the disk. Each track on the disk is divided into an equal number of sectors. Typically, the sectors are arranged in slices such that the sectors at the outer edge of the disk take up more linear space along a track than the sectors near the inner edge of the disk. However, each sector is used to store an identical amount of data, typically 512 bytes.

The sectors on each track are grouped into clusters. The grouping of sectors into clusters is performed by the operating system and thus is not a physical delimitation. Every track on the disk contains the same number of clusters, and every cluster on the disk contains the same number of sectors. A cluster usually comprises from one to sixty-four sectors, depending on the size of the disk, with each sector usually storing 512 bytes of data. Each cluster is independently accessible.

A computer's operating system stores each file in one or more clusters on the logical disk. Large files may require several clusters to hold all of the data associated with the file, while extremely small files can be stored in a single cluster. Because a cluster may not store data from more than one file, one or more sectors of a cluster will remain empty if the file does not contain enough data to fill all the sectors of the cluster. Therefore, disk space is used most efficiently if the amount of data stored in each cluster is fairly small relative to the size of most files.

Magnetic hard disk drives typically include a stack of several rigid aluminum disks, or platters, that are coated with a magnetic material. Each platter may store data on both its top and bottom surfaces. Data is encoded on the each of the disks by magnetizing areas of the disk surface. Data is retrieved or added to the disk by a read/write head. Each head of the magnetic disk drive consists of a tiny electromagnet attached to a pivoting arm, with the electromagnet being positioned very close to the surface of the disks. One such head is provided for each recording surface on each platter. The arms pivot to move the heads back and forth over the surface of the disks in a generally radial path. Head actuators pivot the arms to control the movement of the heads. When data is written onto a disk, the head is positioned over the appropriate area of the disk where the data is to be written. An electrical current supplied to the head produces a magnetic field that magnetizes a small area of the disk near the head. This small magnetized area represents a digital bit. Similarly, when data is read from a disk drive, the head is positioned over the appropriate magnetized area of the disk, which induces a current in the head. The current induced in the head is then decoded into digital data.

The disk drive's platters are all connected to a single spindle. The spindle is connected to a motor, which spins the disks in unison at a constant rate. Although the sectors of the disk may take up different amounts of space, the amount of data stored within each sector is identical. This allows the disks to spin at a constant rate to retrieve equal amounts of data regardless of the location of the sector on the disk.

When a new cluster on the disk is accessed, two mechanical operations must occur before the head actually begins to read or write data. First, the head is moved radially from its current location to the location of the track that contains the destination cluster. "Seek time" refers to the time required for the arm holding the head to overcome the effects of inertia and friction and to effect its movement. Seek time also includes "settle time," which is the time required for the head to settle in a stationary position after its movement. Second, the head must wait for the cluster containing the desired data to spin beneath the head. This time is referred to as "rotational latency." Because the disk spins at a constant rate, the maximum amount of time that the head must wait for the desired cluster to pass beneath it is the time required for the platter to complete one revolution. Therefore, each access of a new cluster creates an inherent delay due primarily to the mechanical requirements of accessing the correct area of the disk.

The operating system must maintain a record of the location of files stored on the logical disk. Several data structures are used for file access. Each sector on the logical disk has a unique identifying number that is based on the location of the sector on the logical disk. Similarly, each cluster has a unique cluster number. Identifying numbers are assigned such that adjacent sectors and clusters are consecutively numbered. The primary data structure used for determining what parts of the logical disk are being used for file data storage is the File Allocation Table (FAT). Other file systems include the High Performance File System (HPFS) and the NT File System (NTFS). Although the present invention is described in the context of a FAT file system, the invention is applicable to other types of file systems.

In a FAT file system, the FAT is stored near the beginning of the logical disk or partition and contains an entry for each cluster on the logical disk. Clusters are listed in the FAT consecutively by their cluster number. The FAT entry for each cluster contains the number of the cluster in which the next part of that file is contained. The FAT entry for the cluster containing the last data of a file contains an End of File (EOF) entry. Therefore, each file stored on the logical disk is represented in the FAT as a chain of one or more clusters. The FAT indicates whether each cluster is allocated to a file, but does not directly tell the operating system of the computer to which file a given cluster belongs.

As mentioned above, disk space may be used most efficiently if each cluster is fairly small (e.g., 4 KB). However, the size of a disk partition's FAT determines the maximum number of clusters that can be included on a logical disk and, consequently, the size of the clusters. For example, in a FAT 16 file system, the FAT uses a 16-bit number to represent each cluster. This allows for a maximum of 65,536 (i.e., 64K) clusters on the disk. The size of a disk can be divided by the size of the FAT to determine the minimum size of each cluster, as illustrated in Table I:

TABLE 1

| Disk Size | Min. Cluster Size (bytes) |
| --- | --- |
| Up to 32 MB | 512 |
| >32 MB to 64 MB | 1K |
| >64 MB to 128 MB | 2K |
| >128 MB to 256 MB | 4K |
| >256 MB to 512 MB | 8K |
| >512 MB to 1 GB | 16K |
| >1 GB to 2 GB | 32K |

The FAT 32 file system uses a 28-bit number to represent each cluster and is able to keep track of $2^{28}$ clusters, which thus allows for 4 K byte or smaller clusters on even very large logical disks. FAT 32 is available in the OSR2 (OEM Service Release 2) versions of the "WINDOWS 95" operating system, and subsequent "WINDOWS" operating systems, such as the "WINDOWS 98" operating system.

A data structure called the Directory includes a list of all files and subdirectories (some of which are stored as regular files with the directory bit set) stored on the logical disk. The root directory differs from subdirectories in that the root directory has no parent directory and is typically stored near the beginning of the logical disk prior to sectors used to store file data. The directory has an entry for each file containing the cluster number in which the first part of that file is stored. By storing the starting cluster number of each file, the directory ties each file to the FAT.

To access a file on the logical disk, the operating system of the computer reads the directory entry for the file to determine the FAT entry corresponding to the first cluster in which file data is stored. The operating system then reads the entire chain of FAT entries starting at the file's first FAT entry. Using the location of the first cluster and the chain of clusters from the FAT, the operating system can determine every cluster that belongs to the file and access each cluster accordingly.

As data is added to or deleted from the logical disk, the disk may become fragmented. Fragmentation refers to the storing of parts of a single file in non-adjacent clusters on the logical disk. When a file is written to the logical disk, the operating system stores the data in vacant space identified by the FAT's free cluster list. The vacant space used to store the data may include several non-adjacent clusters.

INSTALLING OR REARRANGING A PROGRAM TO IMPROVE LAUNCH TIME

An exemplary method for installing application-related files in a manner that improves a program's launch time is illustrated in FIGS. 2–7. Those skilled in the art will appreciate that the present invention may be employed in conjunction with a variety of application, utility, and operating system-related programs, including the "MICROSOFT OFFICE" suite of application programs, which is published by Microsoft Corporation of Redmond, Washington.

Like the prior art, the present invention must determine the order in which portions of files are read from a logical disk during program launch. However, unlike the prior art, which makes this determination and rearranges the files after the files have already been installed on the logical disk, the present invention arranges the files in near optimal order as they are initially installed on the logical disk. In general terms, this is accomplished by determining the order in which various portions of the files are accessed during launch, creating a load sequence list, which is included on the installation disk, and installing the launch-related portions of the files in the order dictated by the load sequence list. Alternatively, the load sequence list may be used to rearrange the files after they have been installed on the logical disk. The load sequence list may be distributed on an installation disk, via the internet, or via other distribution means.

Figure 2:
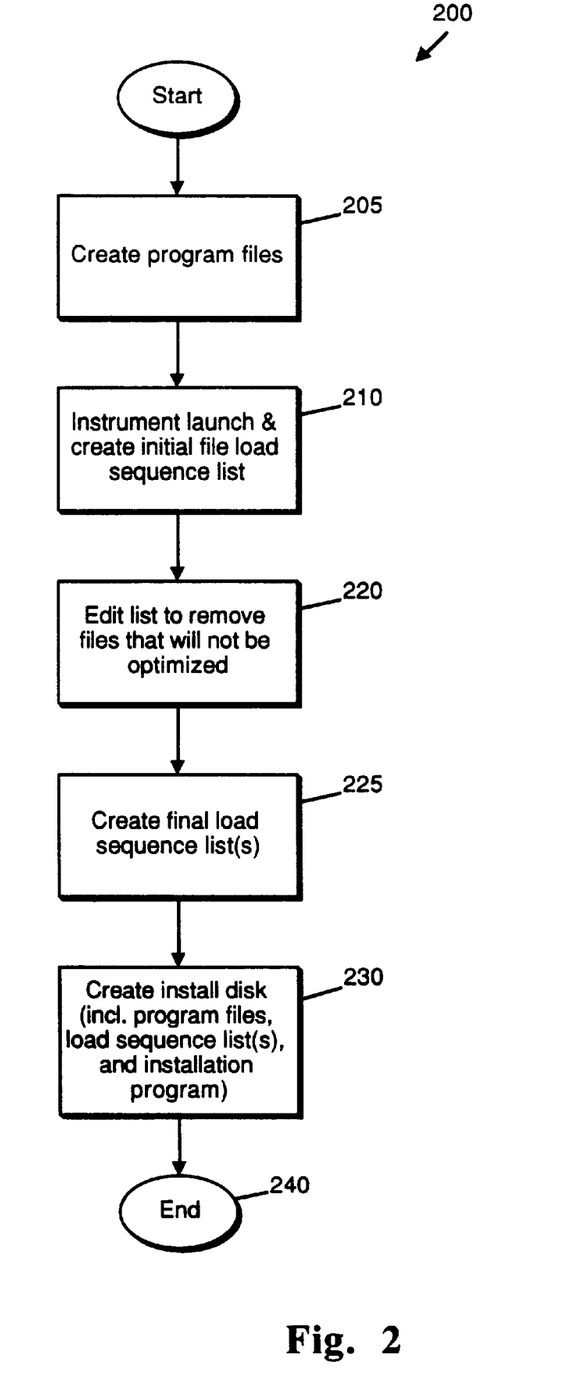
FIG. 2 is a flow diagram illustrating an exemplary method for creating an installation disk for installing files on a logical disk in the order in which they are loaded during program launch.
Figure 3:
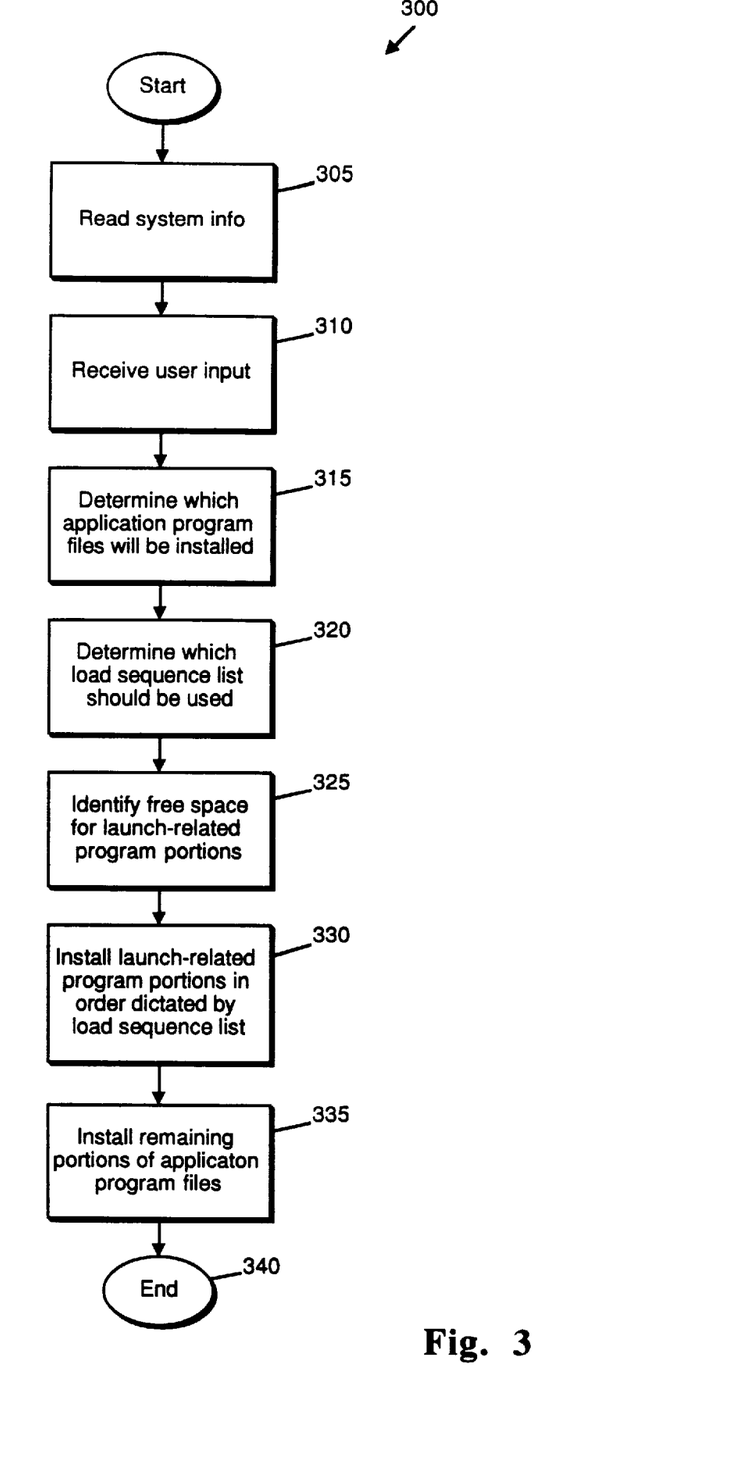
FIG. 3 is a flow diagram illustrating an exemplary method for installing files from an installation disk to a logical disk and storing the files in the order in which they are loaded during program launch.

FIGS. 2 and 3 are flow diagrams illustrating exemplary methods for creating an installation disk and for installing files on a logical disk in the order in which they are loaded during launch. The flow diagram of FIG. 2 illustrates a method 200 for creating an installation disk that includes application-related files, one or more load sequence lists, and an installation program. The flow diagram of FIG. 3 illustrates a method 300 for installing files from the installation disk to a logical disk and storing them in the order in which they are read during launch.

Referring first to FIG. 2, which illustrates a method 200 for creating an installation disk. The first step in the method 200 is the creation of the application-related files (step 205). In an exemplary method, this step is performed in a conventional manner familiar to those skilled in the art and involves the creation of all files associated with the program (e.g., an application program). These files may include executable files, dynamic linked libraries, data files, preference files, and the like.

After the files are created, the method 200 proceeds to step 210. At this point, the files are installed on a computer and the program is launched. The launch process is monitored or "instrumented" by instrumentation code that is able to determine which portions of the files are accessed during launch. The instrumentation code creates a load sequence list that indicates which file portions were read and the order in which they were read.

Figure 4:
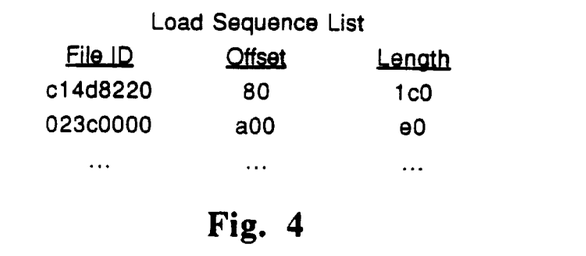
FIG. 4 is a table illustrating the contents of an exemplary load sequence file.

The format of an exemplary load sequence list is illustrated in FIG. 4. Each entry in the list identifies the file that was accessed, the offset into the file, and the amount of data that was read. The offset and length are measured in bytes and relative to the beginning of the file. The offset and length define the start and length of the portion that was read. This step results in a list of all files touched during program launch, the location within each file that was read, and the amount of data that is read from the disk when the program is launched.

From step 210 the method 200 proceeds to step 220. Those skilled in the art will appreciate that the initial load sequence list, which was created at step 210 and includes a record of all files that were touched during boot, includes files that may not be part of the program itself. For example, when an application program is launched, it may require the computer to read parts of various system files or other shared files that exist apart from the application program itself. At step 220 the method 200 analyzes the contents of the initial load sequence list and removes files that will not be optimized or reinstalled on a user's computer when the program is installed. The excluded files will include files that cannot, or should not, be altered by the installation program and files that are likely to change fairly frequently (e.g., preferences files). Those skilled in the art will appreciate that this step may be accomplished in different ways, including using an exclude list that prevents them from being included in the initial load sequence list, or processing the load sequence list at install time to ignore certain files.

After the load sequence list is edited to remove files that will not be optimized, the method 200 proceeds to step 225, where one or more final load sequence lists are created. Those skilled in the art will appreciate that the sequence for loading files may be affected by a variety of factors associated with the computer on which the program will be installed. For example, the specific version of the operating system (including major releases and minor updates) and the cluster size associated with the computer may have some bearing on the best sequence for installing file portions onto the logical disk. Therefore, different load sequence lists may be created for each of these scenarios. For example, a load sequence list for use with a particular version of an operating system may add additional files to or delete files from the optimal load sequence for another machine configuration. Similarly, a load sequence list may be provided for use with various cluster sizes. Alternatively, a single load sequence list for use with small (e.g., 4K) clusters may be provided, and load sequence lists for other cluster sizes derived from it at file ordering time. The final load sequence lists may have the same format as the example of FIG. 4.

At step 230, the actual installation disk (e.g., a CD-ROM or floppy disks) is created. The installation disk will include the application-related files, the load sequence lists, and a setup or installation program. When the installation disk is inserted in a drive on the user's computer, the user will launch the installation program to install the files on the computer's logical disk. Based on user input and configuration information read from the computer, the installation program will determine which files need to be installed and the order in which the files should be installed, and will cause the files to be read from the installation disk and written to the disk in the proper order.

FIG. 3 illustrates a method 300 for installing files from an installation disk to a logical disk and storing the launch-related program portions in the order in which they are read during program launch. In an exemplary embodiment, the method 300 is executed by the installation program that is included on the installation disk, which is a CD-ROM that is inserted into the disk drive 30 (FIG. 1).

The method 300 begins when a user launches the installation program and proceeds to step 305. At step 305 the installation program queries the computer and obtains data pertaining to the operating system installed on the computer, the characteristics of the hard disk drive, etc.

At step 310 the installation program prompts the user and obtains information pertaining to the particular program or programs the user would like to install. The installation program may also require the user to enter his or her name and a serial number before the installation will proceed.

At step 315 the installation program uses the information obtained at steps 310 and 315 to determine which files from the installation disk should be installed on the hard disk drive.

At step 320 the installation program uses information obtained at steps 310 and 315 to determine which load sequence list should be used to determine the order in which the launch-related portions of the files should be installed and stored on the logical disk. As mentioned earlier, different load sequence lists may be provided to accommodate different versions of an operating system, different hard disk drive cluster sizes, etc.

Figure 5:
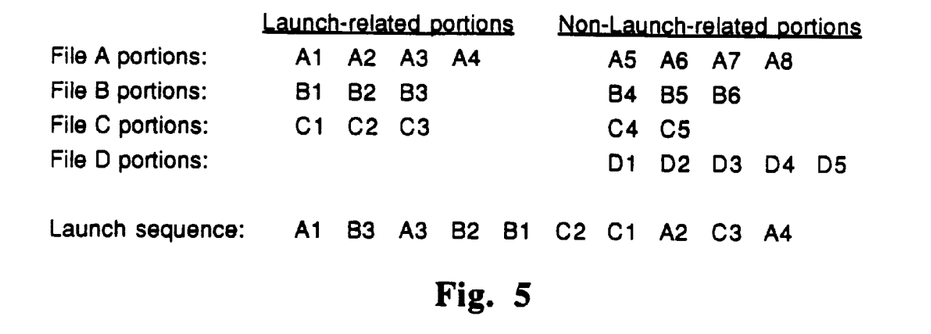
FIG. 5 is a table illustrating the start-up-related components of three files and an exemplary load order for these components.

FIG. 5 illustrates examples of portions of four application files (Files A, B, C, and D) and a simple load sequence list, which identifies the launch-related file portions and the order in which they are loaded when the program is launched. In this example, the application program includes Files A, B, C, and D. Of course, an application program may include many additional files. Each file includes multiple portions (e.g., A1–A8, B1–B6, C1–C5, and D1–D5). However, only Files A, B, and C includes portions that are loaded during application launch. These launch-related portions include portions A1–A4, B1–B3, and C1–C3. The remaining portions of Files A, B, and C, and the entirety of File D are not loaded during launch. Those skilled in the art will appreciate that the launch-related portions of each file (e.g., A1–A4) need not be contiguous or precede the non-launch-related portions of the file (e.g., A5–A8). The final line of FIG. 3 illustrates the launch loading sequence, which describes the order in which the launch-related portions of Files A, B, and C are loaded during launch. In this example, the launch loading sequence is A1, B3, A3, B2, B1, C2, C1, A2, C3, A4.

The goal of the remainder of the installation process (steps 325, 330, and 335) is to install the launch-related file portions in contiguous clusters on the logical disk in the launch loading sequence described above. Thus, the installation process may be described as having two objectives: (1) writing the launch-related file portions in the proper order and (2) ensuring that the launch-related file portions are stored in contiguous sectors on the logical disk. The goal of writing the launch-related file portions in the proper order is addressed by the provision of the load sequence list. Ensuring that the file portions are stored in contiguous clusters is challenging due to various characteristics of the FAT file systems that are used on most personal computers.

In general, FAT file systems write files to the logical disk in "cluster free list" order. In other words, when a file is written to a hard disk drive, the first cluster of the file will be written to the first free cluster identified in the FAT, the second cluster of the file will be written to the next free cluster identified in the FAT, and so forth. In many cases, the free clusters are not contiguous. Therefore, when installing a program, it is desirable to identify a portion of the logical disk that includes enough contiguous free clusters to store the program's launch-related file portions. The remaining portions of the files may be written in cluster free list order.

At step 325, the installation program identifies blocks of contiguous free clusters (on the logical disk) that will be used to store the launch-related portions of the files. The present invention contemplates several methods for identifying available disk space sufficient to store the launch file portions.

A first approach is to assume that existing files are stored at the beginning of the logical disk and that there is a sufficient amount of contiguous free space at the end. Although this assumption is unrealistic, it could be achieved by suggesting, during the installation process, that the user defragment the logical disk using a conventional defragmentation utility. After the disk is defragmented, the application program can be installed in the free space at the end of the disk, with the launch-related portions of the files being stored in contiguous clusters. Those skilled in the art will appreciate that this approach is somewhat undesirable because of the time that would be required to defragment the logical disk prior to installation and the fact that some users may be reluctant or unable to perform the suggested defragmentation.

A second approach is to assume that there is a large free space at the end of the disk, but some non-contiguous free clusters at the beginning of the disk. In this approach, the launch-related file portions from the load sequence list will be installed last. This will allow the remainder of the application files (i.e., the non-launch-related portions) to be installed first and saved on the disk in cluster free list order. In most cases, storing this large amount of file data should result in the non-contiguous free clusters being filled with non-launch-related file portions and the launch-related portions of the files finally being installed in the contiguous free clusters that remain available at the end of the disk.

A third approach to identifying sufficient contiguous free clusters involves reading the entire free cluster list and tracking the sizes of any groups of contiguous free clusters. The list is then sorted by size to find the largest groups of contiguous free clusters. The largest groups of free clusters are identified and earmarked for storage of the launch-related file portions. After the destination clusters for the launch files are identified, the process resorts back to the original list of free clusters and begins to write data to the logical disk. If the destination clusters are not the first free clusters in the list, a temporary file is written to the free clusters that need to be filled in order to get to the desired destination clusters. After the launch files are written to the contiguous destination clusters, the temporary file is deleted, and those clusters are returned to the cluster free list. The use of temporary files is discussed in more detail below.

A fourth approach is similar to the third, but reduces the amount of data that may need to be written to the temporary file. It is possible that the third approach will require a lot of data to be written to a lot of small groups of clusters in the early portions of the disk. In order to minimize this activity, the fourth approach uses the earliest contiguous cluster groups or set of groups to provide a significant improvement in program launch time.

After sufficient contiguous free clusters have been identified for the installation of the launch-related file portions, the installation program proceeds to step 330 and writes the launch-related file portions to the free space in the proper order. Those skilled in the art will appreciate that the particular steps required to write the launch file portions to the free space in the order dictated by the load sequence list will depend on a variety of factors. The most important of these factors is likely to be the computer's particular operating system, which provides tools for writing files to the logical disk and restrictions on how files may be written to the hard drive. Two approaches suitable for use with the "WINDOWS 95" operating system are described below.

Those skilled in the art will appreciate that the simplest scenario for writing the launch files to the logical disk occurs when the free space is all contiguous and located at the end of the logical disk and the operating system does not attempt to force files to be contiguous. In this simple, and perhaps unrealistic scenario, the process of writing the files to the logical disk could be implemented as follows. First, the installation program opens the necessary files on the CD-ROM (for read) and on the logical disk (for write). Next, the first cluster listed in the load sequence list is read from the CD-ROM and written to the hard disk drive. In some cases, it is necessary to flush the output file to ensure that the data is actually written to the disk. These steps are repeated until all of the clusters in the load sequence list are written to the logical disk. At that point, the installation program can proceed to step 335 where the remaining portions (i.e., the non-launch-related portions) of the files are read from the CD-ROM and written to the logical disk. When all files are written, the read and write files are closed and the operating system updates the FAT file system. The method 300 then terminates at step 340 and the installation is complete.

Specific methods for writing individual files to non-contiguous clusters (step 330) are discussed in the context of the "WINDOWS 95" operating system. The "WINDOWS 95" operating system attempts to keep files in contiguous clusters. So, when multiple clusters are written to a single file, the operating system tries to put them in contiguous clusters. In an embodiment of the present invention, this feature of the operating system is overcome by using temporary files to take up space on the hard disk drive, and to force the launch-related portions of each file to be written in non-contiguous clusters in the desired order. Those skilled in the art will appreciate that the operating system and the file system impose certain requirements regarding the order in which files may be written. Most importantly, the clusters of a file are allocated in monotonically increasing order. In other words, the first cluster of a file is allocated before the second cluster of the file, and so forth, regardless of the order in which information is written to the file.

Figure 6:
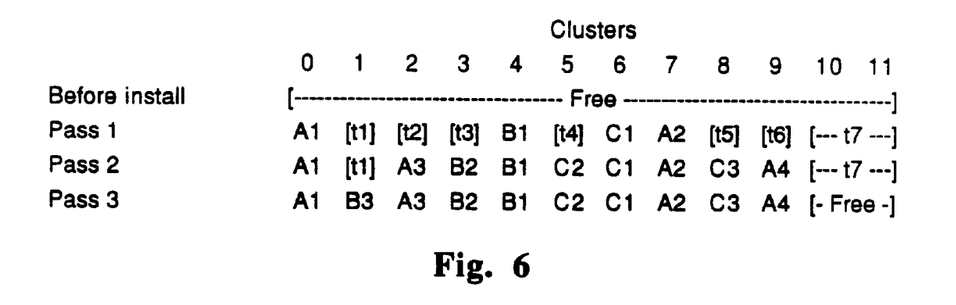
FIG. 6 is a table illustrating an exemplary method for writing file components to free clusters on a logical disk.

An example of the use of temporary files is illustrated in FIG. 6, which reflects the contents of 12 clusters on the logical disk during different phases of the installation process. In this example, the 10 file portions of FIG. 5 will be written to the 12 clusters shown in FIG. 6. Before the installation begins, the 12 clusters (arbitrarily numbered 0–11) are contiguous clusters in the free cluster list. If the contiguous clusters 0–11 are not the first clusters in the free cluster list, the installation program writes a temporary file to the clusters before cluster 0. This results in cluster 0 being the first free cluster in the free cluster list.

The installation program will read the desired cluster order from the appropriate load sequence list, read the clusters from the CD-ROM, and write them to clusters 0–9 of the logical disk. Because the operating system requires the clusters of each file to be written in monotonically increasing order, the process of writing the files to the logical disk may require multiple passes through the free space and involve the use of temporary files to ensure data is written in the desired clusters.

Referring now to FIG. 6, in the first pass, the installation program reads the load sequence list and determines that cluster A1 should be loaded first. Because this is the first cluster in File A, it may be written immediately to cluster 0.

Next, the installation program determines that cluster B3 should be written to cluster 1. However, cluster B3 cannot be saved yet because clusters B1 and B2 have not yet been written to the hard disk drive. Therefore, the installation program writes a temporary file t1 to cluster 1.

After temporary file t1 is written, the installation program determines that cluster A3, should be written. However, cluster A3 cannot be saved because cluster A2 has not yet been written to the hard disk drive. Therefore, the installation program writes a temporary file t2 to cluster 2.

Temporary file t3 is then written to cluster 3 because cluster B2 cannot be saved until after cluster B1 has been written to the hard disk drive.

After temporary file t3 is written, the installation program determines that cluster B1 should be written to cluster 4. Because this is the first cluster in File B, it may be written to cluster 4 of the hard disk drive.

After cluster B1, the installation program writes temporary file t4 to cluster 5 because cluster C2 cannot be saved until after cluster C1 has been saved.

Next, the installation program determines that cluster C1 should be written to cluster 6. Because cluster C1 is the first cluster in File C, it is written to cluster 6.

Next, the installation program determines that cluster A2 should be written to cluster 7. Because cluster A1 has already been written, cluster A1 may be written to cluster 7.

After cluster A2 is written to the hard disk drive, the installation program determines that cluster C3 should be written to cluster 8. However, cluster C3 cannot be written yet because cluster C2 has not been stored. The installation program writes a temporary file t5 to cluster 8.

Next, the installation program determines that cluster A4 should be written to cluster 9. However, because cluster A3 has not yet been written to the hard disk drive, the installation program writes a temporary file t6 to cluster 9.

After the installation program has written data to all of the clusters that will be used to store the launch-related file portions, the installation program writes a large temporary file t7 to the remaining free space on the disk.

During the second pass, the installation program continues the process of writing the launch-related files to the hard disk drive in monotonically increasing order.

During the second pass, cluster B3 still cannot be written to the hard disk drive because cluster B2 has not been saved.

Cluster A3 can be written to cluster 2 because clusters A1 and A2 have already been saved. Therefore, the installation program deletes temporary file t2 and writes cluster A3 to cluster 2.

Cluster B2 can be written to cluster 3 because cluster B1 has already been saved. The installation program deletes temporary file t3 and writes cluster B2 to cluster 3.

Cluster C2 can be written to cluster 5 because cluster C1 has already been saved. The installation program deletes temporary file t5 and writes cluster C2 to cluster 5.

Cluster C3 can be written to cluster 8 because clusters C1 and C2 have already been saved. The installation program deletes temporary file t5 and writes cluster C3 to cluster 8.

Finally, cluster A4 can be written to cluster 9 because clusters A1–A3 have already been saved. The installation program deletes temporary file t6 and writes cluster A4 to cluster 9.

During pass 3, cluster B3 can finally be written to cluster 1 because clusters B1 and B2 have already been saved. The installation program deletes temporary file t1 and writes cluster B3 to cluster 1.

After all of the launch-related file portions have been written, the installation program deletes the temporary file t7 and any temporary files that were written to clusters before cluster 0. This returns this unused clusters to the free cluster list. At that point, the remaining program portions (i.e., the non-launch-related file portions) are read from the CD-ROM and written to the hard disk drive. These files will be saved to the hard disk drive in cluster free list order.

Figure 7:
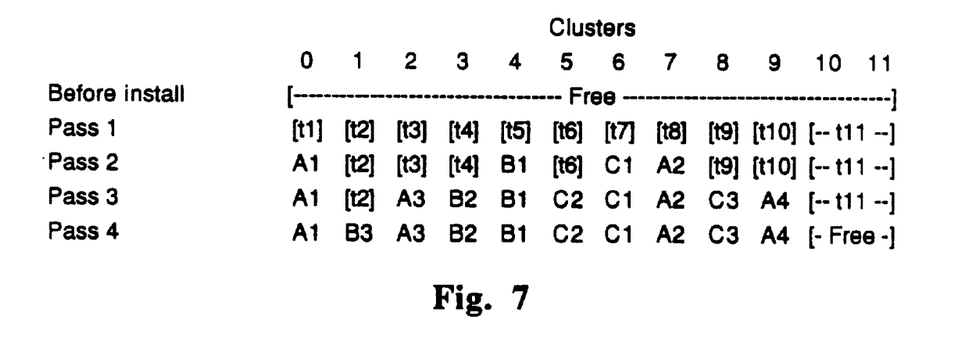
FIG. 7 is a table illustrating an exemplary method for writing file components to free clusters on a logical disk.

Some versions of the "WINDOWS 95" operating system employ a file allocation strategy that assumes that if two files are open and a program is writing to both, the program would want some free space between the files. FIG. 7 illustrates a second method for writing launch file portions to the hard disk clusters 0–9 despite this feature of the operating system. This second approach is very similar to the approach illustrated in FIG. 6, but requires an extra pass through the free clusters to create temporary files in each of the free clusters.

In the example of FIG. 7, the 10 file portions of FIG. 5 will be written to clusters 0–9 of the hard drive. Before the installation begins, the 12 clusters (numbered 0–11) are contiguous clusters in the free cluster list. If the contiguous clusters 0–11 are not the first clusters in the free cluster list, the installation program writes a temporary file to the clusters before cluster 0. This results in cluster 0 being the first free cluster in the free cluster list.

During pass 1, the installation program writes separate temporary files (t1–t10) to each of the clusters that will be used to store a file cluster identified in the load sequence list. Another temporary file t11 is written to all of the free clusters that follow cluster 9. This ensures that the operating system will not be able to leave space between the clusters that are written by the installation program.

Passes 2–4 proceed just as passes 1–3 of FIG. 6 and are used to write the file clusters in monotonically in creasing order. However, during pass 2, the temporary files t1, t5, t7, and t8 must be deleted because before the clusters A1, B1, C1, and A1 can be written to clusters 1, 4, 6, and 7, respectively.

After all of the launch-related file portions have been written to the logical disk, the installation program deletes the temporary file t11 and any temporary files that were written to clusters before cluster 0. This returns this unused clusters to the free cluster list. At that point, the remaining file portions (i.e., the non-launch-related file portions) are read from the CD-ROM and written to the logical disk. These files will be saved to the logical disk in cluster free list order.

The preceding discussion has described the present invention in the context of several embodiments. In general, these embodiments includes a load sequence list that identifies which launch-related program portions should be installed onto contiguous clusters on the logical disk, methods for identifying sufficient number of contiguous free clusters, and methods for writing program portions to the contiguous clusters in the desired order.

The present inventors have contemplated several additional features that can be incorporated into embodiments of the present invention.

The methods of the present invention can be expanded to include not only the launch-related portions of new files, but existing files on the logical disk and additional portions of the new program.

For example, the present invention may be used to optimize system files and other previously installed files if they are included in the load sequence list. In order to accomplish this optimization, the installation process will proceed as described above, but will also include opening the existing file for read and a new temporary file for write. The relevant clusters of the existing file will be written to the contiguous free clusters along with other launch-related program portions. After the launch-related portions are all written to contiguous clusters on the logical disk, the original existing file will be deleted and the temporary file will renamed to have the same name as the deleted original file.

As described above, the principles of the present invention may be used to instrument and install (or rearrange) other common, disk-intensive portions of the program. For example, the code that executes routines such as OPEN, SAVE, LOAD, and PRINT could be instrumented and the results included in a load sequence file on the installation disk. The installation program could then use this information to write these portions of the code to contiguous portions of the logical disk when the new program is installed, or to rearrange the relevant portions of the code after it is installed.

As described above, temporary files may be used to take up almost all of the free space on the logical disk during some phases of the installation process. These temporary files are typically deleted by the installation program upon completion of the installation process. However, in order to ensure that the temporary files are removed and the unused space is available to the computer, the post-reboot or "tune-up" process carried out by the operating system can be programmed to check for the presence of one or more temporary files and to delete the files if found. The post-reboot portion of the setup process can also be used to delete and rename any optimized system files that could not be deleted or renamed because they were in use during the installation process.

Figure 8:
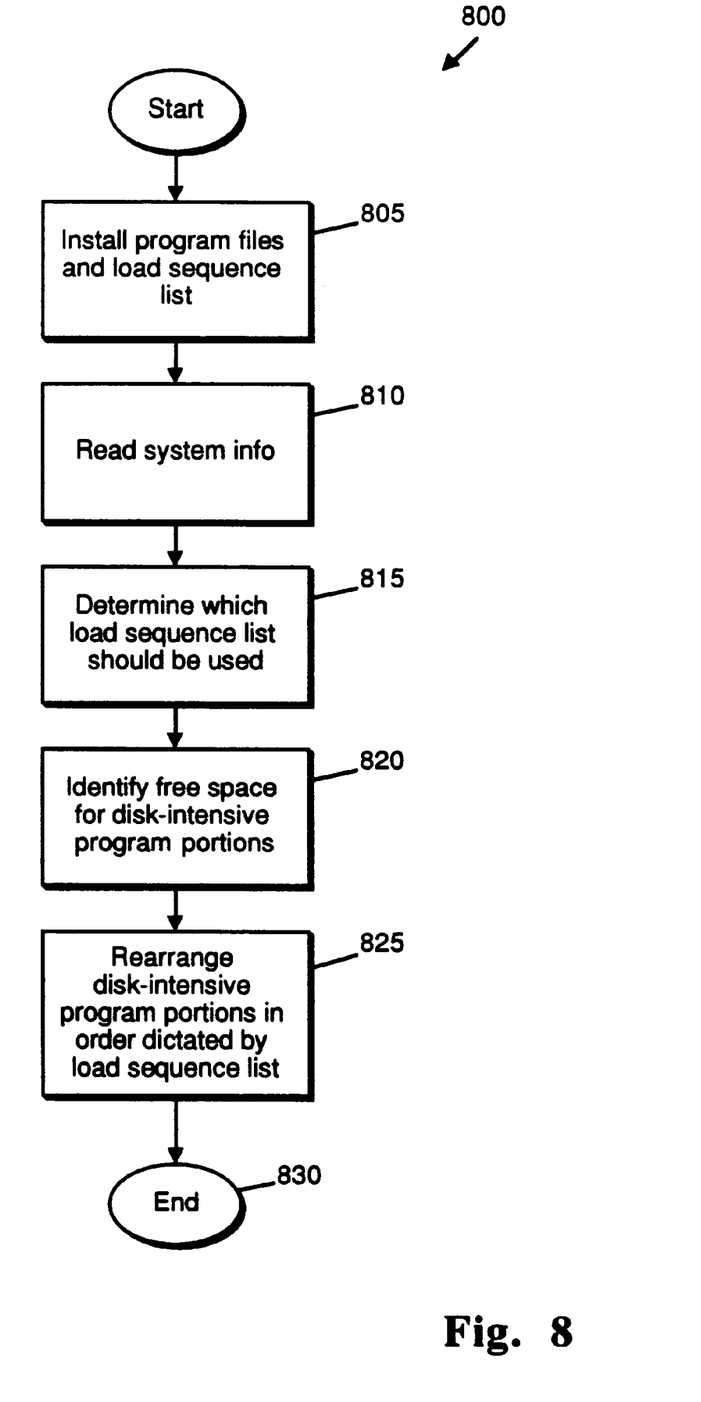
FIG. 8 is a flow diagram illustrating an alternative method for optimizing portions of files after they have been installed on a logical drive.

FIG. 8 is a flow diagram illustrating an alternative method 800 for using the principles of the present invention to optimize code portions related to startup and other disk-intensive operations after the code has been installed on a logical drive. Like the method of FIG. 3, the method 800 employs an installation disk that includes one or more load sequence lists and program files. However, in this embodiment, the program files are first installed on a logical drive in a conventional manner along with a copy of the load sequence list. At some point after the installation, a tune-up program can use the load sequence list to rearrange the disk-intensive data in an optimal fashion.

At step 805 the method 800 includes installing the program files on the logical drive in a conventional manner. At this point, a copy of the load sequence list is also copied onto the logical drive.

After the program has been installed, a separate program may be used to rearrange the program portions that are associated with disk-intensive operations such as program startup. This "tune-up" or rearranging program may be run at a variety of times. For example, the tune-up program can be run automatically when the computer is first restarted after program installation. The tune-up program can also be run manually whenever the user elects to perform maintenance activities on his or her computer.

Step 810 is the first step in the tune-up or rearrangement process. At step 810 the tune-up program queries the computer and obtains data pertaining to the operating system installed on the computer, the characteristics of the hard disk drive, etc.

At step 815 the tune-up program uses the information obtained at step 810 to determine which load sequence list should be used to determine the order in which the disk-intensive portions of the files should be rearranged on the logical disk. As mentioned earlier, different load sequence lists may be provided to accommodate different versions of an operating system, different hard disk drive cluster sizes, etc.

Those skilled in the art will appreciate that program suites, such as the "MICROSOFT OFFICE" suite of programs, include more than one application program. The present invention may be applied to the installation of a suite of programs by providing a load sequence list for each application program. If multiple versions of an operating system are supported, the invention may provide a load sequence list per application program per supported system. When the programs are "optimized" (during or after installation), the applicable load sequence lists may be concatenated together in a predetermined order. If a launch-related file portion is included in more than one load sequence list, that portion may be removed from all but the first load sequence list to include it. The optimization would then proceed accorded to the merged load sequence list.

At step 820, the tune-up program identifies blocks of contiguous free clusters (on the logical disk) that will be used to store the disk-intensive portions of the files. As described above, the present invention contemplates several methods for identifying available disk space sufficient to store the launch file portions.

After sufficient contiguous free clusters have been identified for the installation of the launch-related file portions, the installation program proceeds to step 825 and rearranges the disk-intensive file portions in the free space in the proper order.

In summary, the method of FIG. 8 allows files to be rearranged at (or shortly after) installation, and also allows them to be tuned up or fixed at any time after installation. By using the load sequence list, this tune-up is accomplished without the monitoring function used in the prior art.

Finally, the processes described above use the read and write functions provided by the operating system. This approach is very robust and virtually eliminates the possibility that the installation process will damage data on the user's hard disk drive. However, those skilled in the art will appreciate that data can be written to the hard disk drive by using low level functions to write data at the cluster level. This approach requires the installation program to write the file portions to the proper clusters and then to go back and patch the FAT. Although this approach may be employed in the context of the present invention, it provides a greater risk that data on the hard drive will be corrupted in some manner.

REVIEW OF THE DETAILED DESCRIPTION

From the foregoing description, it will be appreciated that the present invention provides an improved system and method for installing or rearranging files in a manner that improves program launch time. A principle benefit of the present invention is that eliminates the need to monitor the startup process after a program is installed by providing one or more load sequence lists.

The embodiments described above monitor the program's startup process and determine the order in which file portions are read from a disk during disk-intensive operations, such as launching the program or selecting certain program commands. This data is used to create a load sequence list, which indicates the order in which various portions of the files are read during launch. During installation, the installation program reads the data from the load sequence list and writes the launch-related file portions in that order in contiguous clusters on the logical disk. Alternatively, the launch-related portions of the files are rearranged in accordance with the load sequence list after the program is installed. After this is accomplished, the computer can read launch-related data from the logical disk in the proper order from contiguous disk clusters, which minimizes or eliminates wasted time that would result from disk accesses if the disk heads had to move between non-contiguous clusters in order to read the launch data.

The invention may be implemented in one or more program modules that are based upon and implement the features illustrated in FIGS. 2–8. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

In addition, although the invention was described primarily in the context of an installation program that installs application programs under the "WINDOWS 95" operating system, those skilled in the art will appreciate that the invention is applicable to program modules of various types and to systems running a variety of operating systems and using a variety of file systems. For example, the present invention may be used to install application programs, utility programs, operating system program modules, and the like. As described above, the present invention may also be employed to arrange the program data associated with a variety of disk-intensive operations, including launching an application program, launching the code associated with a program command (e.g., FILE OPEN), and the like.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-readable medium storing an application program module to be installed on a disk of an end-user's computer system, comprising:

the application program module, comprising a plurality of files including launch-related portions;

a load sequence list indicating the order in which the launch-related portions of the plurality of files are to be read during application program launch and, based on the order that the launch-related portions of the plurality of files are to be read, indicating the order in which the files are to be installed on the disk of the end-user's computer system, the load sequence list being determined prior to installing the application program module on the disk of the end-user's computer system; and computer-executable instructions for:

identifying at least one group of contiguous free clusters comprising the largest number of contiguous free clusters on the disk of the end-user's computer system, and installing the launch-related portions of the plurality of files in the at least one group of contiguous free clusters, the launch-related portions being stored on the disk in the order indicated in the load sequence list.

2. The computer-readable medium of claim 1, wherein the load sequence list includes a plurality of entries, each of the entries identifying one of the plurality of files and the portion of the file to be installed.

3. The computer-readable medium of claim 1, wherein the step of installing the launch-related portions comprises the steps of:

reading an entry in the load sequence list, the entry identifying one of the plurality of files and a portion of the file to be read;

reading the portion of the file from the identified one of the plurality of files;

writing the portion of the file to the disk.

4. The computer-readable medium of claim 1, wherein the step of identifying at least one group of contiguous free clusters comprises the steps of:

reading a list of available free clusters from data stored on the disk; and identifying the groups of contiguous free clusters having the largest numbers of contiguous free clusters.

5. The computer-readable medium of claim 1, wherein the plurality of files include non-launch-related portions, the non-launch-related portions being stored on the disk after the step of installing the launch-related portions of the plurality of files.

6. The computer-readable medium of claim 1, wherein the launch-related portions are read during program startup.

7. The computer-readable medium of claim 1, wherein the launch-related portions are read when executing a program command.

8. A method for installing program code from an installation disk to a disk, comprising the steps of:

creating a load sequence list, which indicates the order, in which the launch-related portions of the plurality of files are to be read during application program launch and, based on the order that the launch related portions of the plurality of files are to be read, indicating the order in which the files are to be installed on a disk;

reading a plurality of entries from the load sequence list, which is determined prior to installing the launch-related portions to the disk, stored on the installation disk, each entry identifying a file portion associated with the program code;

for each entry read from the load sequence list, reading from the installation disk the file portion identified by the entry; and for each entry read from the load sequence list, writing the read file portion to a group of contiguous free clusters on the disk, the file portion being stored on the disk in an order corresponding to the entries in the load sequence list.

9. The method of claim 8, wherein each entry in the load sequence list includes a file identifier and the location of the data to be read from the identified file.

10. The method of claim 8, wherein each entry in the load sequence list includes a file name, an offset into the named file, and an amount of data to be read from the named file.

11. The method of claim 8, further comprising the steps of writing non-launch-related program code from the installation disk to the disk after writing the file portions associated with each entry of the load sequence list.

12. A method for installing program code from an installation disk to a disk of an end-user's computer system, comprising the steps of:

creating a plurality of files including launch-related portions;

determining the order in which the launch-related portions are to be read;

creating a load sequence list prior to installing the launch-related portions to the disk of the end-user's computer system, the load sequence list indicating the order in which the launch-related portions of the plurality of files are to be read during application program launch and, based on the order that the launch-related portions of the plurality of files are to be read, indicating the order in which the files are to be installed on the disk of the end-user's computer system; and storing the plurality of files, the load sequence list, and an installation program on an installation disk, the installation program including computer-executable instructions for:

identifying at least one group of contiguous free clusters comprising the largest number of contiguous free clusters on the disk of the end-user's computer system, and installing the launch-related portions of the plurality of files in at least one group of the contiguous free clusters, the launch-related portions being stored on the disk of the end user's computer system in the order indicated in the load sequence list.

13. The method of claim 12, wherein the load sequence list includes a plurality of entries, each of the entries including the name of one of the plurality of files and the portion of the file to be installed.

14. The method of claim 12, wherein the step of installing the launch-related portions comprises the steps of:

reading an entry in the load sequence list, the entry identifying one of the plurality of files and a portion of the file to be read;

reading from the identified one of the plurality of files the portion of the file;

writing the portion of the file to the disk.

15. The method of claim 12, wherein the plurality of files include non-launch-related portions, the non-launch-related portions being stored on the disk after the step of installing the launch-related portions of the plurality of files.

16. A method for installing and optimizing program code on a logical disk, comprising the steps of:

creating a plurality of files including disk-intensive portions associated with disk-intensive operations;

determining the order in which the disk-intensive portions are to be read during the disk-intensive operations;

creating a load sequence list prior to installing the plurality of files to the logical disk, the load sequence list indicating the order in which the disk-intensive portions of the plurality of files are to be read during the disk-intensive operations and, based on the order that the disk-intensive portions of the plurality of files are to be read, indicating the order in which the files are to be installed on the logical disk;

storing the plurality of files, the load sequence list, and an installation program on an installation disk;

installing the plurality of files and the load sequence list from the installation disk to the logical disk; and after installation on the logical disk, optimizing the disk-intensive portions by performing the steps of:
identifying at least one group of contiguous free clusters comparing the largest number of contiguous free clusters on the logical disk, and rearranging the disk-intensive portions in the order indicated in the load sequence list.

17. The method of claim 16, wherein the load sequence list includes a plurality of entries, each of the entries including the name of one of the plurality of files and the portion of the file to be rearranged.

18. The method of claim 17, wherein the portion is identified by an offset from the beginning of the file and an amount of data read from the file.

19. The method of claim 16, wherein the step of rearranging the disk-intensive portions comprises the steps of:

reading an entry in the load sequence list, the entry identifying one of the plurality of files and a portion of the file to be read;

reading from the identified one of the plurality of files the portion of the file;

writing the portion of the file to the logical disk.

* * * * *